Figure 1:
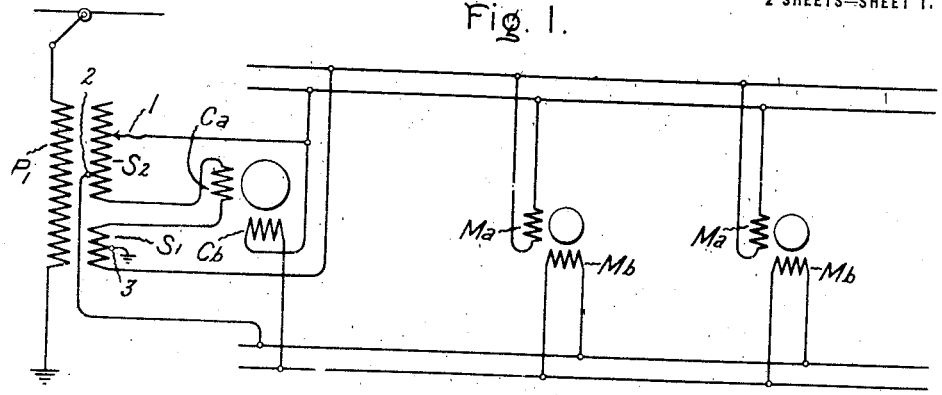

E. F. W. ALEXANDERSON.
SPLIT PHASE SYSTEM.
APPLICATION FILED JAN. 29, 1914. RENEWED JULY 20, 1915.

1,170,211.

Patented Feb. 1, 1916.
2 SHEETS—SHEET 1.

WITNESSES:
J. Ellis Glen
Anthony Mart

INVENTOR:
ERNST F. W. ALEXANDERSON,
BY
HIS ATTORNEY.

E. F. W. ALEXANDERSON.
SPLIT PHASE SYSTEM.
APPLICATION FILED JAN. 29, 1914. RENEWED JULY 20, 1915.

1,170,211.

Patented Feb. 1, 1916.

WITNESSES:
J. Ellis Glenn.
Anthony Mart

INVENTOR:
ERNST F. W. ALEXANDERSON,
BY
HIS ATTORNEY.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SPLIT-PHASE SYSTEM.

1,170,211.

Specification of Letters Patent. Patented Feb. 1, 1916.

Application filed January 29, 1914, Serial No. 815,279. Renewed July 20, 1915. Serial No. 41,014.

*To all whom it may concern:*

Be it known that I, ERNST F. W. ALEXANDERSON, a citizen of the United States, residing at Schenectady, in the county of Schenectady, State of New York, have invented certain new and useful Improvements in Split-Phase Systems, of which the following is a specification.

My invention relates to alternating current polyphase motors, and more particularly to the use of such motors in a so-called split phase system with a single phase source of supply and a phase converter and especially in a split phase system of the type described in my Patent No. 1,150,652.

When polyphase motors are supplied with energy from a single phase source of supply with the use of a phase converter, it is frequently desirable to use a number of motors with a single phase converter. In order, then, that the current carrying capacity of the apparatus used shall not exceed its normal limit, it is necessary to increase the working potential. Such an artifice may, however, cause such an insulation strain on the windings that it will be as prohibitive an arrangement as would an increased current. Frequently, as in locomotive practice, a transformer is interposed between the supply and the apparatus. It may then be that one of the windings of the transformer secondary or of the other apparatus is grounded. It then becomes necessary to limit the potential to ground from any point in the windings. If there is no ground connection, then it is just as necessary to limit the static strain on the apparatus. To meet these conditions and overcome the difficulties encountered, I have accordingly devised a novel arrangement of the elements involved, and the object of my invention is to so arrange the secondary windings of a supply transformer and the windings of a phase converter and polyphase motors connected thereto that I may safely increase the working potential without substantially increasing the insulation strain on the apparatus. I do this by providing a plurality of secondary transformer windings and so connecting these (in such a sequence) with the related motor and converter phases that the potential strain on the insulation of the windings is within normal limits.

My invention will be more readily understood when taken in connection with the following description and the accompanying drawings, in which—

Figure 2:
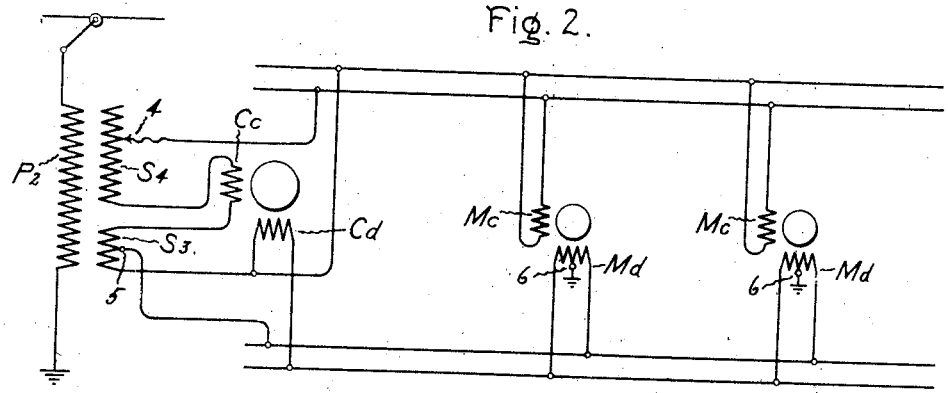
Figure 3:
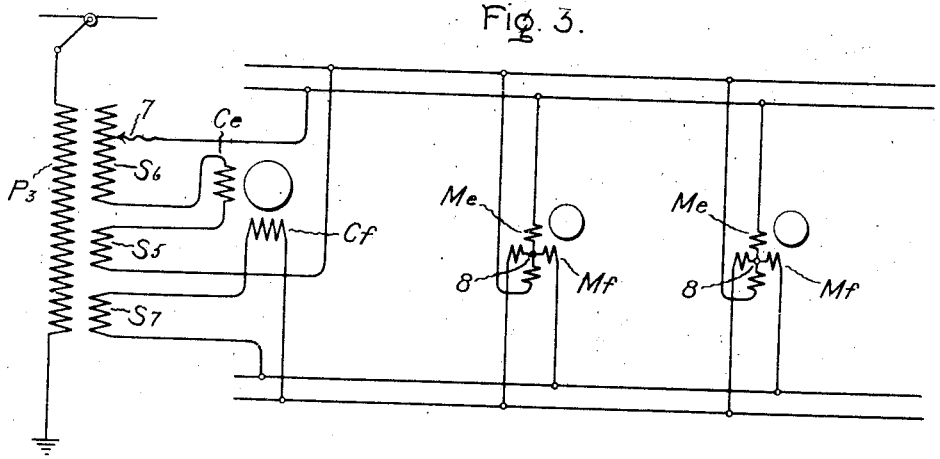
Figure 4:
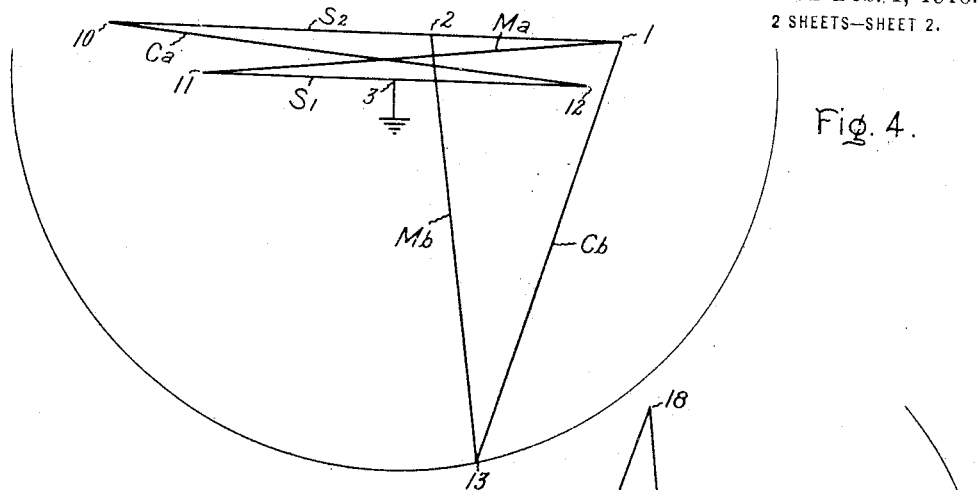
Figure 5:
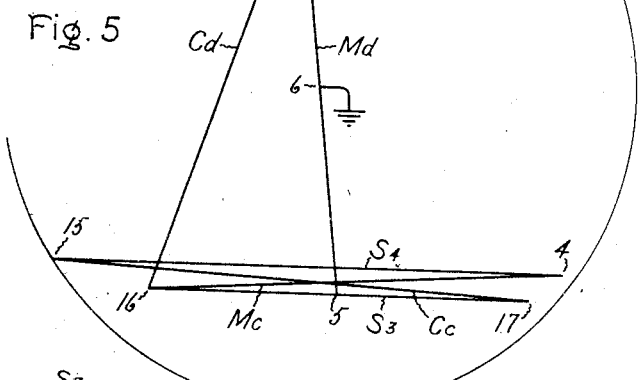
Figure 6:
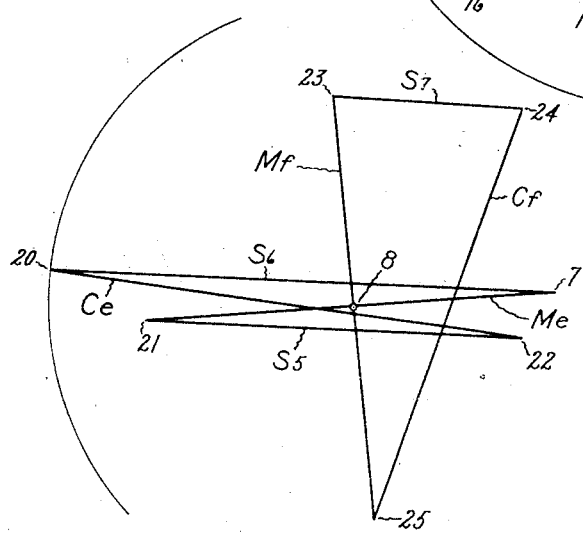

Figures 1, 2 and 3 are diagrams showing various arrangements for connecting the essential elements according to my invention. In Fig. 1, one of the secondary windings of the transformer is provided with a ground, and the control is effected by simultaneously varying the impressed voltage on one phase of motor and converter and the interpolated voltage on the other phase of motor and converter. In Fig. 2 a ground is provided on one phase of the motor winding, and in this arrangement the impressed voltage is varied, but the interpolated voltage is kept constant. In Fig. 3, no ground is provided, but the motors are designed with a neutral point and the interpolated voltage is supplied by a separate transformer secondary. The control is effected by varying the impressed voltage on one phase of the motor and converter. Figs. 4, 5 and 6 are vector diagrams illustrating the resulting conditions during running for the respective connections shown in Figs. 1, 2 and 3.

In general, it will be seen that each of the arrangements shown in Figs. 1, 2 and 3 comprises a transformer connected to the source of supply, a phase converter, and one or more motors which are connected in parallel. For the purposes of illustration in each case, I have shown the preferred form as comprising a plurality of secondary windings associated with a single primary winding, but it will be obvious to those skilled in the art that other equivalent constructions might equally well be substituted.

In Fig. 1, the primary $P_1$ is connected to a single phase source of supply and in inductive relation to this primary winding are two secondary windings $S_1$ and $S_2$. Connected between and in series with the two secondaries is phase A of the converter, designated $C_a$, while connected to the outer or free terminals of the secondaries is phase A of the motor, designated as $M_a$. It will be seen that the outer terminal 1 of $S_2$ is indicated as a movable contact, and it will be understood that the transformer secondary will be provided with suitable taps to enable a variable voltage to be impressed on phase A of the motor and converter. In the specification and the claims, when I speak of the "free terminals" of the secondary windings; I intend merely to designate any terminals or taps to which $C_a$ is not connected, and do not refer merely to the extreme ends of the secondary windings. Phase B of motor and converter, comprising $M_b$ and $C_b$, are connected in series, and one terminal of $M_b$ is connected to the fixed point 2 on $S_2$, while the free terminal of $C_b$ is connected to the movable contact 1. For the purposes of control connections for elements not shown in the drawing, I find it convenient to supply a ground connection at some point 3, preferably the middle point, on the transformer winding $S_1$. It will then be seen that the control of the impressed and interpolated voltage may be effected by moving the contact 1.

The results obtained by such a manner of connection as shown in Fig. 1 are illustrated in Fig. 4, wherein the vectors represent the voltages in the various windings, their relative lengths indicating the relative values of these voltages, and the angles between them representing the phase relations. Beside this, each of the lines in the vector diagram may be taken to represent the corresponding winding. It will then be seen that the diagram correctly represents the actual connections, the free terminal of $M_b$ being connected to the point 2 on $S_2$, and the joint terminal of $M_a$ and $C_b$ being connected at 1. Inasmuch as the vector diagram is drawn to represent the conditions obtained in the running position of the control, the point 1 has been moved to the extreme end of $S_2$. At 3 is indicated the ground connection which is preferably at the middle point of $S_1$. It then results, as will be apparent from an inspection of the drawing, that the points of extreme potential to ground are indicated by the numerals 1, 10, 11, 12 and 13, and all these will be substantially equal distances from the ground connection. Inasmuch as the linear distance between any point on the vector diagram and the point 3 represents the potential to ground of the corresponding point of the various windings, it will be seen that the voltage strains are evenly distributed and are in no instance excessive. This relation results from the particular sequence of connections between the various windings, which constitutes the essence of my invention.

In Fig. 2, the primary $P_2$ has associated therewith secondaries $S_3$ and $S_4$. Phase C of the converter, designated $C_c$, is connected between $S_3$ and $S_4$, while phase C of the motor is connected to the free terminals of $S_3$ and $S_4$, one of these (the terminal 4) being a movable connection, as in Fig. 1. In this arrangement a ground connection is provided at 6, substantially the middle point of phase D of the motors. $C_d$ and $M_d$ are connected in series between the point 5 on $S_3$, which is preferably substantially the middle point thereof, while the other terminal is connected to the outer end of $S_3$. The corresponding vector diagram shown in Fig. 5 represents the conditions obtained when running, and the correspondingly lettered vectors represent the voltages on the various windings. An inspection of this figure shows that the points of extreme potential, as 4, 15, 16, 17 and 18, are all substantially equidistant from point 6, which is connected to ground. Because the diagram indicates the conditions obtained when running, the point 4 has been moved to the extreme end of $S_4$ in order to impress the maximum potential on phase C of motor and converter. It will be seen that the interpolated voltage on phase D is here kept constant, while the impressed voltage on phase C is varied.

In Fig. 3, the primary $P_3$ has associated therewith secondary windings $S_5$ $S_6$ and $S_7$. Between the secondaries $S_5$ and $S_6$, $C_e$, representing phase E of the converter, is connected, while phase E of the motor, designated as $M_2$, is connected between the outer terminal $S_5$ and the movable contact 7. Phase F of motor and converter is connected in series and the interpolated voltage is supplied from the secondary $S_7$. In this instance a neutral connection at 8 is provided between the two motor phases.

The corresponding vector diagram, Fig. 6, shows that a similar condition here results as in the previous arrangement, and that the points of extreme potential, as at 7 and 20 to 25, inclusive, are substantially equidistant from the neutral point 8. Here, again, the diagram represents conditions when running, and the movable contact 7 is shown as connected at the extreme end of $S_6$.

It will, therefore, be seen that by means of the particular sequence of windings which is embodied in each of the arrangements shown in Figs. 1, 2 and 3, I am enabled to keep the potential strain on the windings within normal limits and at the same time provide a working potential substantially double that of the voltage strain. I have, therefore, succeeded in carrying out the object of my invention as previously specified, and am able to use twice the number of motors without increasing the current to be handled by the control system or any one element, and, further, without increasing the potential strain on the windings of the various pieces of apparatus. Such an arrangement is of great practical importance because it enables the construction of a source of motive power, such, for instance, as might be used upon an electric locomotive, of very high power, without exceeding the current capacity of the motors and of the contactors of ordinary design, and without increasing the voltage strain on the windings.

I conceive that various modifications of the particular arrangement which I have herein shown might be made without departing from the scope of my invention, and I therefore seek to cover in the appended claims all such variations which fall within the true scope and spirit of my invention.

What I claim as new and desire to secure by Letters Patent of the United States, is:—

1. In combination, a phase converter, a motor, and a plurality of secondary transformer windings, a phase of said converter and a phase of said motor being connected between two of the secondary transformer windings so that said secondary windings are interposed between the terminals of the machine windings, another phase of said converter being connected to another phase of said motor and to a secondary transformer winding.

2. In combination, a phase converter, a quarter-phase motor, and a plurality of secondary transformer windings, one phase of said converter being connected in series with two of said secondary transformer windings and with one phase of said motor so that said secondary windings alternate with said machine windings, another phase of said converter being connected in series with another phase of said motor and with a secondary transformer winding having an induced voltage different from the maximum voltage impressed on said first-mentioned phases.

3. In combination, a single phase source of supply, a phase converter, a quarter-phase motor, and a transformer with its primary connected to said supply and its secondary divided into sections, one phase of said converter being connected to one terminal of each of two of the sections of the secondary, one phase of said motor being connected to the free terminals of said sections, another phase of said converter being connected in series with another phase of said motor, and means for interpolating a voltage different from that of said source in the latter circuit.

In witness whereof, I have hereunto set my hand this 28th day of January, 1914.

ERNST F. W. ALEXANDERSON.

Witnesses:
BENJAMIN B. HULL,
MARGARET E. WOOLLEY.